(12) United States Patent
Higashi et al.

(10) Patent No.: US 8,993,189 B2
(45) Date of Patent: Mar. 31, 2015

(54) HEAT-RESISTANT ALLOY, ALLOY MEMBER FOR FUEL CELL, FUEL CELL STACK DEVICE, FUEL CELL MODULE, AND FUEL CELL DEVICE

(75) Inventors: Masahiko Higashi, Kirishima (JP); Tetsurou Fujimoto, Kirishima (JP); Norimitsu Fukami, Kirishima (JP); Kenji Shimazu, Kirishima (JP)

(73) Assignee: Kyocera Corporation, Kyoto (JP)

( * ) Notice: Subject to any disclaimer, the term of this patent is extended or adjusted under 35 U.S.C. 154(b) by 261 days.

(21) Appl. No.: 13/146,391

(22) PCT Filed: Jan. 25, 2010

(86) PCT No.: PCT/JP2010/050883
§ 371 (c)(1),
(2), (4) Date: Jul. 26, 2011

(87) PCT Pub. No.: WO2010/087298
PCT Pub. Date: Aug. 5, 2010

(65) Prior Publication Data
US 2011/0281194 A1 Nov. 17, 2011

(30) Foreign Application Priority Data

Jan. 28, 2009 (JP) .................................. 2009-016519
Feb. 25, 2009 (JP) .................................. 2009-042005

(51) Int. Cl.
*H01M 8/10* (2006.01)
*H01M 8/02* (2006.01)
(Continued)

(52) U.S. Cl.
CPC .......... *H01M 8/0206* (2013.01); *H01M 8/0228* (2013.01); *H01M 8/2475* (2013.01); *H01M 8/249* (2013.01); *H01M 2008/1293* (2013.01); *Y02E 60/50* (2013.01); *Y02E 60/525* (2013.01)
USPC ...................................................... 429/458

(58) Field of Classification Search
None
See application file for complete search history.

(56) References Cited

U.S. PATENT DOCUMENTS

| 5,942,349 A | 8/1999 | Badwal et al. ................. 429/34 |
| 2008/0297178 A1* | 12/2008 | West et al. ..................... 324/693 |
| 2009/0297917 A1* | 12/2009 | Higashi et al. ................. 429/34 |

FOREIGN PATENT DOCUMENTS

| DE | 112006002956 | * 11/2008 | ............. H01M 8/02 |
| DE | 112006002956 T5 | 11/2008 | |

(Continued)

OTHER PUBLICATIONS

English translation of JP 2007317610 (2010).*
(Continued)

*Primary Examiner* — Yoshitoshi Takeuchi
(74) *Attorney, Agent, or Firm* — Volpe and Koenig, P.C.

(57) ABSTRACT

A heat-resistant alloy capable of effectively suppressing diffusion of Cr, as well as an alloy member for a fuel cell, a fuel cell stack device, a fuel cell module and a fuel cell device are provided. A heat-resistant alloy includes a Cr-containing alloy, and a Cr-diffusion suppression layer located on at least a part of a surface of the Cr-containing alloy, the Cr-diffusion suppression layer being made by laminating a first layer that contains a Zn-containing oxide and a second layer that does not contain ZnO but contains an (La, Sr)MnO$_3$-based perovskite oxide in that order, so that it is possible to effectively suppress diffusion of Cr. By using the heat-resistant alloy for an alloy member for a fuel cell, a fuel cell stack device, a fuel cell module and a fuel cell device each having improved reliability can be obtained.

4 Claims, 7 Drawing Sheets

(51) Int. Cl.
  *H01M 2/32*  (2006.01)
  *H01M 2/24*  (2006.01)
  *H01M 2/22*  (2006.01)
  *H01M 2/20*  (2006.01)
  *H01M 8/24*  (2006.01)
  *H01M 8/12*  (2006.01)

(56) References Cited

FOREIGN PATENT DOCUMENTS

| JP | 07-201340 | | 8/1995 | | |
| JP | 11-501764 | | 2/1999 | | |
| JP | 2006-019058 | | 1/2006 | | |
| JP | 2007-273358 | | 10/2007 | | |
| JP | 2007-317610 | * | 12/2007 | ............. | H01M 8/02 |
| JP | 2007317610 | * | 12/2007 | ............. | H01M 4/86 |
| JP | 2008-034203 | * | 2/2008 | ............. | H01M 8/02 |
| JP | 2008-081804 | | 4/2008 | | |
| JP | 2008-243595 | | 10/2008 | | |
| JP | 2009-152016 | | 7/2009 | | |

OTHER PUBLICATIONS

Ormerod, Solid Oxide Fuel Cells, Cem Soc Rev 17-28 (2003).*
English translation of JP 2008-034203.*
Jong-Jin Choi et al., "Oxidation Resistance Coating of LSM and LSCF on SOFC Metallic Interconnects by the Aerosol Deposition Process" J. Am. Ceram. Soc., vol. 90, No. 6, pp. 1926-1929, Jun. 1, 2007.
Extended European search report dated Jan. 21, 2013 issued in coresponding Europrean application 10735766.7.
Chinese language office action dated Nov. 22, 2013 and an English concise explanation thereof issued in corresponding Chinese application 201080005100.3.

* cited by examiner

HEAT-RESISTANT ALLOY, ALLOY MEMBER FOR FUEL CELL, FUEL CELL STACK DEVICE, FUEL CELL MODULE, AND FUEL CELL DEVICE

CROSS-REFERENCE TO RELATED APPLICATIONS

This application is a national stage of international application No. PCT/JP2010/050883, filed on Jan. 25, 2010, and claims the benefit of priority under 35 USC 119 to Japanese Patent Application No. 2009-016519, filed on Jan. 28, 2009, and Japanese Patent Application No. 2009-042005, filed on Feb. 25, 2009, which are incorporated herein by reference.

TECHNICAL FIELD

The present invention relates to a heat-resistant alloy containing Cr, an alloy member for a fuel cell, a fuel cell stack device, a fuel cell module, and a fuel cell.

BACKGROUND ART

There have been proposed various fuel cell devices that generate power using hydrogen-containing gas and oxygen-containing gas as a next-generation energy source.

Such fuel cell devices are generally configured such that a fuel cell stack device made by combining a plurality of fuel cells is housed in a housing, and generate power by supplying a fuel gas (hydrogen-containing gas) to a fuel-side electrode of each fuel cell and supplying air (oxygen-containing gas) to an air-side electrode. In addition, the plurality of fuel cells are electrically connected to one another in series by a felt-like or plate-like current collecting member.

By the way, the above-mentioned current collecting member, a manifold configured to supply a reactant gas such as the fuel gas to the fuel cells, and the like generally employ an alloy that is easily processed and has heat resistance, and for example, an alloy containing 10 to 30 mass % of Cr has been used.

Here, when the current collecting member made of an alloy containing Cr is disposed between the fuel cells and the fuel cells are electrically connected to one another in series and power is generated for a long time, Cr contained in the current collecting member diffuses to the air-side electrode of the fuel cell and an interface between the air-side electrode and a solid electrolyte layer, resulting in an increase in electric resistance, so that the power generation performance of the fuel cell is degraded. This phenomenon is called Cr poisoning.

Here, in order to suppress such Cr poisoning, typically, a heat-resistant alloy made by coating the surface of a Cr-containing alloy with an oxide film of metal such as Mn, Fe, Co, or Ni is proposed (refer to Patent Literature 1).

In addition, a current collecting member made by coating a first layer that contains Zn and a second layer that contains a composite oxide having a perovskite structure containing La and Fe, or Mn, and an oxide of Zn in the surface of an alloy containing Cr is proposed (refer to Patent Literature 2).

CITATION LIST

Patent Literature

Patent Literature 1: Japanese Unexamined Patent Publication JP-A 11-501764 (1999)

Patent Literature 2: Japanese Unexamined Patent Publication JP-A 2007-273358

SUMMARY OF INVENTION

Technical Problem

However, as disclosed in Patent Literature 1, in the case where the surface of the Cr-containing alloy is coated with an oxide film of metal such as Mn, Fe, Co, or Ni, diffusion of Cr from the Cr-containing alloy (hereinafter, occasionally referred to as Cr diffusion) is suppressed by the metal oxide film to some extent; however, there is a problem that the amount of Cr diffused is still high.

Moreover, as disclosed in Patent Literature 2, in the case where the second layer contains the perovskite composite oxide containing La together with Fe or Mn, and the oxide of Zn, due to a difference between the coefficients of thermal expansion of the perovskite composite oxide containing La together with Fe or Mn, and the oxide of Zn, there is concern that cracks may be generated in the second layer.

In addition, in the case where the fuel cells are electrically connected via the current collecting member, when the current collecting member is configured to have the oxide film of metal such as Mn, Fe, Co, or Ni on the surface of the Cr-containing alloy, due to a difference between the coefficients of thermal expansion of the metal oxide film on the surface of the alloy and the fuel cell, the current collecting member and the fuel cell separate from each other, so that there is concern that the electrical connection between the fuel cells is degraded.

Moreover, in the case where the Cr-containing alloy is used for a member such as the manifold configured to supply the reactant gas such as the fuel gas, to the fuel cells, as the fuel cells generate power for a long time, a coating of chromium oxide is formed on the surface of the alloy due to diffusion of Cr from the Cr-containing alloy, so that volatilization of Cr from the coating of the chromium oxide, so-called Cr volatilization, occurs. Accordingly, Cr poisoning occurs in the fuel cells, and there is concern that the power generation performance of the fuel cells is degraded.

Therefore, an object of the invention is to provide a heat-resistant alloy capable of suppressing diffusion of Cr, an alloy member for a fuel cell, a fuel cell stack device, a fuel cell module, and a fuel cell device.

Solution to Problem

A heat-resistant alloy according to the invention comprises a Cr-containing alloy; and a Cr-diffusion suppression layer located on at least a part of a surface of the Cr-containing alloy, the Cr-diffusion suppression layer being made by laminating a first layer that contains a Zn-containing oxide and a second layer that does not contain ZnO but contains an (La, Sr)MnO$_3$-based perovskite oxide in that order.

In this heat-resistant alloy, since the Cr-diffusion suppression layer made by laminating the first layer that contains the Zn-containing oxide and the second layer that does not contain ZnO but contains the (La, Sr)MnO$_3$-based perovskite oxide in that order is provided, diffusion of Cr can be suppressed.

Moreover, since the second layer does not contain ZnO but contains the (La, Sr)MnO$_3$-based perovskite oxide, generation of cracks in the second layer due to a difference between the coefficients of thermal expansion of ZnO and the (La, Sr)MnO$_3$-based perovskite oxide can be suppressed, even at high temperature. Accordingly, a heat-resistant alloy with improved long-term reliability can be provided.

In addition, in the heat-resistant alloy according to the invention, it is preferable that the second layer is composed of the (La, Sr)MnO$_3$-based perovskite oxide.

In this heat-resistant alloy, diffusion of Cr can be further suppressed.

In addition, in the heat-resistant alloy according to the invention, it is preferable that the first layer contains ZnMn$_2$O$_4$ and MnCo$_2$O$_4$.

In this heat-resistant alloy, the first layer can further suppress diffusion of Cr and can improve the conductivity of the heat-resistant alloy.

In addition, an alloy member for a fuel cell according to the invention is preferably formed of the heat-resistant alloy mentioned above. Accordingly, an alloy member for a fuel cell with improved long-term reliability can be provided.

In addition, a current collecting member according to the invention is preferably a current collecting member configured to electrically connect a plurality of fuel cells to one another, formed of the alloy member for a fuel cell mentioned above, wherein the Cr-diffusion suppression layer covers the surface of the Cr-containing alloy.

In this current collecting member, diffusion of Cr from the Cr-containing alloy is suppressed, so that Cr poisoning of the fuel cells can be suppressed. Accordingly, deterioration of the power generation performance of the fuel cells can be suppressed.

Moreover, since the second layer does not contain ZnO but contains the (La, Sr)MnO$_3$-based perovskite oxide, generation of cracks in the second layer can be suppressed, so that separation of the current collecting member and the fuel cells from each other due to the cracks generated in the second layer can be suppressed.

Moreover, since the second layer does not contain ZnO which has a low conductivity, a reduction in the conductivity of the current collecting member can be suppressed.

In addition, a manifold according to the invention is preferably a manifold configured to supply a reactant gas to a fuel cell, made of the alloy member for a fuel cell mentioned above, wherein the Cr-diffusion suppression layer is located on the surface of the Cr-containing alloy that forms an outer surface of the manifold.

In this manifold, formation of a coating of chromium oxide on the outer surface of the manifold can be suppressed, so that volatilization of Cr can be suppressed. Accordingly, Cr poisoning of the fuel cells can be suppressed, so that deterioration of the power generation performance of the fuel cells can be suppressed.

Moreover, since the second layer does not contain ZnO but contains the (La, Sr)MnO$_3$-based perovskite oxide, generation of cracks in the second layer can be suppressed. Therefore, diffusion of Cr through the cracks can be suppressed, so that diffusion of Cr can be further suppressed.

A fuel cell stack device according to the invention comprises: a plurality of fuel cells; the current collecting member mentioned above configured to electrically connect the plurality of fuel cells in series; and the manifold mentioned above configured to fix lower ends of the fuel cells and supply a reactant gas to the fuel cells, so that diffusion of Cr can be suppressed, and Cr poisoning of the fuel cells can be suppressed. Accordingly, a fuel cell stack device with excellent long-term reliability can be provided.

A fuel cell module according to the invention comprises a housing and the fuel cell stack device mentioned above housed in the housing, so that a fuel cell device with excellent long-term reliability can be provided.

A fuel cell device according to the invention comprises an exterior case, the fuel cell module mentioned above, and an auxiliary device configured to operate the fuel cell module, the fuel cell module and the auxiliary device being housed inside the exterior case, so that a fuel cell device with excellent long-term reliability can be provided.

Advantageous Effects of Invention

Since the heat-resistant alloy according to the invention comprises the Cr-containing alloy and the Cr-diffusion suppression layer located on at least a part of the surface of the Cr-containing alloy, the Cr-diffusion suppression layer being made by laminating the first layer that contains the Zn-containing oxide and the second layer that does not contain ZnO but contains the (La, Sr)MnO$_3$-based perovskite oxide in that order, diffusion of Cr from the Cr-containing alloy can be suppressed. Furthermore, since the second layer does not contain ZnO, generation of cracks in the second layer can be suppressed, so that a heat-resistant alloy with improved long-term reliability can be provided.

In addition, the alloy member for a fuel cell, the current collecting member, and the manifold are formed of this heat-resistant alloy, furthermore, the current collecting member comprises the Cr-diffusion suppression layer to cover the surface of the Cr-containing alloy, and the manifold comprises the Cr-diffusion suppression layer on the surface of the Cr-containing alloy that forms the outer surface of the manifold, so that when those are used for a fuel cell stack device, a fuel cell stack device with excellent long-term reliability can be provided.

Moreover, since the fuel cell stack device is housed in the housing, the fuel cell module with improved long-term reliability can be provided, and moreover, since the fuel cell module and the auxiliary device configured to operate the fuel cell module is housed inside the exterior case, a fuel cell device with improved long-term reliability can be provided.

BRIEF DESCRIPTION OF DRAWINGS

FIG. 3(A) is a side view schematically showing the fuel cell stack device, and FIG. 3(B) is an enlarged plan view of a part of the section of the fuel, cell stack device surrounded by the dotted frame;

DESCRIPTION OF EMBODIMENTS

Hereinafter, a heat-resistant alloy according to the invention will be described using an alloy member for a fuel cell.

Figure 1:
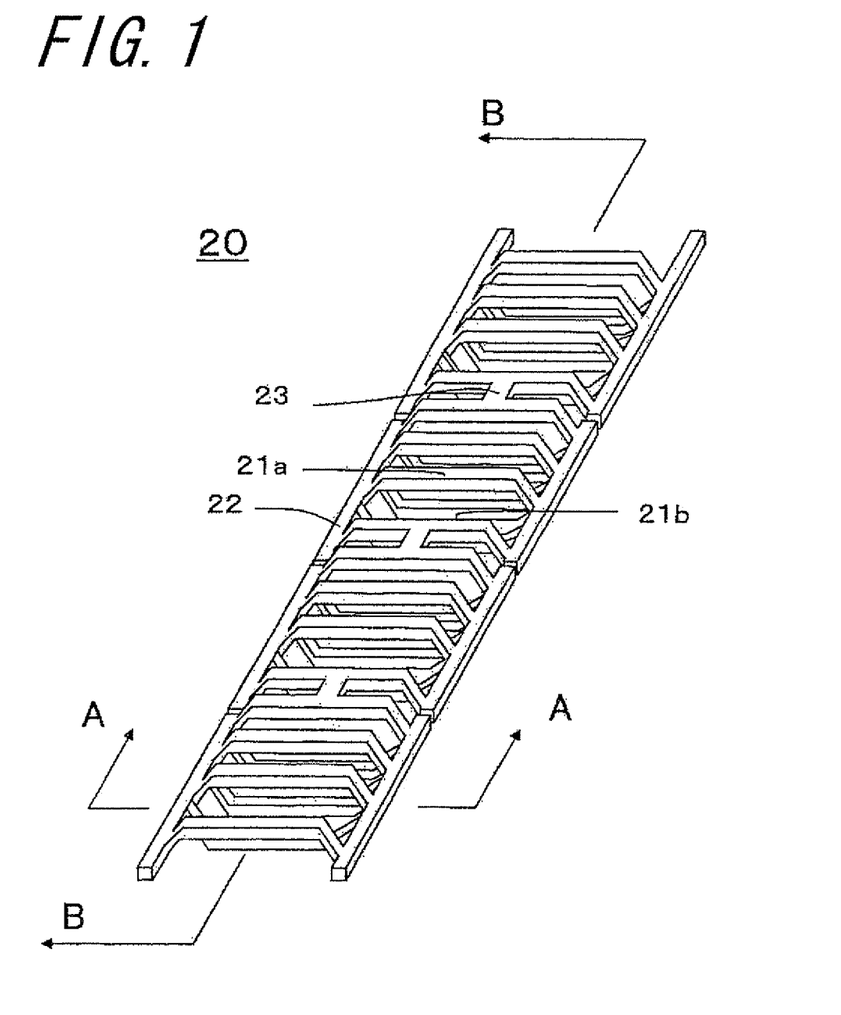
FIG. 1 is a perspective view showing an example of a current collecting member according to the invention.

FIG. 1 is a perspective view showing an example of a current collecting member 20 according to the invention, which is formed of an alloy member for a fuel cell made of the heat-resistant alloy according to the invention. FIG. 2(A) is an enlarged cross-sectional view taken along the line A-A of the current collecting member shown in FIG. 1, and FIG. 2(B) is an enlarged cross-sectional view extracting and showing a part of the cross-section taken along the line B-B of the current collecting member shown in FIG. 1. In addition, like elements are denoted by like reference numerals, the rest is the same as above.

The current collecting member 20 disposed between the fuel cells (not shown in FIGS. 1 and 2) in order to electrically connect a plurality of adjacent fuel cells to one another includes, as shown in FIG. 1, one contact portion 21a that abuts on the adjacent fuel cell on one side, the other contact portion 21b that abuts on the adjacent fuel cell on the other side, and connection portions 22 that bonds both ends of the contact portions 21a and 21b that form a pair to each other, as a current collecting piece of a basic configuration. More specifically, a plurality of band-like contact portions 21a and 21b that are bridged between the connection portions 22 disposed on the left and right are alternately bent with respect to the connection portions 22 to make the current collecting piece (not shown), and a plurality of the current collecting pieces are continuously formed along the longitudinal direction of the fuel cells via conductive connection pieces 23, thereby forming the continuous current collecting member 20.

Moreover, as the fuel cell, although various fuel cells are known, in order to provide a fuel cell having a high power generation efficiency, a solid oxide fuel cell may be employed. Accordingly, the size of a fuel cell device can be reduced with respect to a unit power, and a load following operation that follows varying loads required for a household fuel cell can be performed.

Here, the solid oxide fuel cell module is configured by housing a fuel cell stack device made by combining a plurality of solid oxide fuel cells in a housing, and by supplying a fuel gas (hydrogen-containing gas) to a fuel-side electrode of each cell of the solid oxide fuel cell and supplying air (oxygen-containing gas) to an air-side electrode, generates power at high temperature of 600 to 900° C. Therefore, each member such as a current collecting member and a manifold configured to supply a reactant gas such as a fuel gas to the fuel cells requires heat resistance, and in consideration of the cost, an alloy containing Cr has been preferably used.

Here, according to the invention, the current collecting member 20 has a configuration comprising a Cr-diffusion suppression layer (204 shown in FIG. 2) made by laminating a first layer (202 shown in FIG. 2) that contains a Zn-containing oxide and a second layer (203 shown in FIG. 2) that does not contain ZnO but contains an (La, Sr)$MnO_3$-based perovskite oxide in that order to cover the surface of a current collecting base material 201 made of an alloy containing Cr.

Hereinafter, layers of the alloy member for the fuel cell included in the current collecting member 20 will be described in order.

The current collecting base material 201 needs to have conductive properties and heat resistance, and thus preferably uses an alloy containing 10 to 30 parts by mass of Cr based on 100 parts by mass of the alloy, for example, an Fe—Cr-based alloy, a Ni—Cr-based alloy, or the like.

Here, it is thought that Cr-diffusion in the alloy includes two types of diffusion of a case where Cr vaporizes and diffuses outside as a gas (hereinafter, occasionally referred to as vapor-phase diffusion) and of a case where Cr diffuses outside as a solid (hereinafter, occasionally referred to as solid-phase diffusion). Therefore, in order to suppress the vapor-phase diffusion, it is preferable that the first layer 202 is provided over the entire surface of the current collecting base material 201. Moreover, in order to suppress solid-phase diffusion, it is preferable that the first layer 202 has a relative density of 93% or higher, and particularly, 95% or higher.

As the oxide constituting the first layer 202 provided on the current collecting base material 201, for example, a Zn-containing oxide can be used, and in addition to an oxide of Zn such as ZnO, oxides containing metals such as Mn, Fe, Co, and Ni besides Zn can be suitably selected and used in combination. Particularly, using a Zn-containing metal oxide having at least one of a spinel structure, a corundum structure, a wurtzite structure, and a rock salt structure or a structure similar to those, the first layer 202 which is dense can be provided. In addition, the first layer 202 may be formed by dipping (a dip-coating method of dipping the current collecting base material 201 into a paste for the first layer), plating, sputter deposition, or spray coating.

Specifically, a Zn-containing oxide such as ZnO or $ZnMn_2O_4$ can be used. Though exact reasons are not known, ZnO or $ZnMn_2O_4$ can effectively suppress diffusion of Cr.

However, on the other hand, since ZnO or $ZnMn_2O_4$ has low conductivity, in a case where the first layer 202 only made of ZnO or $ZnMn_2O_4$ is provided on the surface of the current collecting base material 201, there may be a case where electric resistance of the current collecting member 20 is increased. Therefore, in order to increase the conductivity of the first layer 202, for example, $MnCo_2O_4$ which is an oxide containing Co may be contained. In this case, diffusion of Cr can be suppressed, and the conductivity of the current collecting member 20 can be increased.

In addition, it is preferable that the thickness of the first layer 202 falls within a range of 0.2 μm to 10 μm. Particularly, in the case where the first layer 202 is formed of only the Zn-containing oxide such as ZnO or $ZnMn_2O_4$, in terms of the low conductivity of the first layer 202 and the suppression of diffusion of Cr, it is preferable that the thickness of first layer 202 falls within a range of 0.5 μm to 2 μm. In addition, in a case where the first layer 202 contains $ZnMn_2O_4$ and $MnCo_2O_4$, in terms of the suppression of diffusion of Cr as well as conductive properties, it is preferable that the thickness thereof falls within a range of 1 μm to 5 μm.

Here, in the case where the first layer 202 that contains $ZnMn_2O_4$ and $MnCo_2O_4$ is formed, it may be produced by mixing ZnO, $Mn_2O_3$ and $Co_3O_4$ which are raw materials. It is preferable that 47 mol % to 63 mol % of $Mn_2O_3$, 4 mol % to 20 mol % of $Co_3O_4$, and the balance composed of ZnO are added to constitute 100 mol %. Particularly preferably, it is preferable that 50 mol % to 57 mol % of $Mn_2O_3$, 10 mol % to 17 mol % of $Co_3O_4$, and the balance composed of ZnO are added to constitute 100 mol %. Accordingly, the reduction in the conductivity can be suppressed, and diffusion of Cr can be suppressed.

In addition, the first layer 202 containing $ZnMn_2O_4$ and $MnCo_2O_4$ may be produced by mixing $ZnMn_2O_4$ and $MnCo_2O_4$ which are raw materials. In this case, it is preferable that 70 mol % to 95 mol % of $ZnMn_2O_4$ is added. Particularly preferably, it is preferable that 75 mol % to 85 mol % of $ZnMn_2O_4$ is added.

In addition, the first layer 202 may be formed by dipping (the dip-coating method of dipping the current collecting base material 201 into the paste for the first layer), plating, sputter deposition, or spray coating. In terms of cost, it is preferable that the first layer 202 is formed by dipping. In addition, for uniform formation on the surface of the current collecting base material 201, it is also preferable that the first layer 202 is formed by sputter deposition.

In addition, containing ZnO, $ZnMn_2O_4$, and $MnCo_2O_4$ in the first layer 202 can be confirmed by X-ray diffractometry (XRD). Regarding containing $ZnMn_2O_4$ and $MnCo_2O_4$, compared to JCPDS for $ZnMn_2O_4$ and $MnCo_2O_4$, when peaks of $ZnMn_2O_4$ and $MnCo_2O_4$ can be seen in the measured X-ray diffraction diagram, it is confirmed that $ZnMn_2O_4$ and $MnCo_2O_4$ are contained.

The second layer 203 is laminated to cover the surface of the first layer 202, and does not contain ZnO but contains the (La, Sr)$MnO_3$-based perovskite oxide. As the (La, Sr)$MnO_3$-based perovskite oxide (hereinafter, occasionally referred to as LSM), specifically, $La_{0.8}Sr_{0.2}MnO_3$, $La_{0.6}Sr_{0.4}MnO_3$, or the like may be exemplified.

Here, the second layer 203 may be produced by mixing LSM with (La, Sr)(Co, Fe)$O_3$ (occasionally referred to as LSCF). In this case, it is preferable that 1 mass % or higher of LSM is contained in the second layer 203 in terms of mass ratio. Particularly preferably, it is preferable that 30 mass % or higher of LSM is contained in the second layer 203 in terms of mass ratio. Accordingly, diffusion of Cr can be further suppressed.

In addition, LSM contained in the second layer 203 may be produced by mixing LSCF with $Mn_2O_3$. In this case, LSCF and $Mn_2O_3$ are chemically bonded to form LSM, so that diffusion of Cr can be suppressed as described above.

Here, in a case where ZnO, which has a small coefficient of thermal expansion, is contained in the second layer 203, there is concern that cracks may be generated in the second layer 203 due to a difference between the coefficients of thermal expansion. Moreover, in a case where ZnO having a high electric resistance is contained in the second layer 203, there is concern that the conductivity of the second layer 203 is reduced.

The Cr-diffusion suppression layer 204 of the alloy member for the fuel cell according to the invention does not contain ZnO in the second layer 203, so that generation of cracks in the second layer 203 and degradation of the conductive properties of the second layer 203 can be suppressed, thereby providing an alloy member for the fuel cell with improved long-term reliability and power generation efficiency.

In addition, LSM contained in the second layer 203 can be confirmed using, for example, a transmission electron microscope (TEM), and the amount of LSM per predetermined area is obtained using the transmission electron microscope, thereby measuring the amount of LSM contained in the second layer 203.

In addition, containing no ZnO in the second layer 203 can be confirmed by X-ray diffractometry (XRD). Compared to JCPDS for ZnO, in a case where a peak of ZnO cannot be seen in the measured X-ray diffraction diagram, it is confirmed ZnO is not contained.

The second layer 203 is formed using a method such as, plating, sputter deposition, or spray coating, in addition to dipping, and it is preferable that the second layer 203 is formed by dipping in terms of cost.

In addition, in a case where the first layer is provided by sputter deposition and the second layer is provided by dipping, after the first layer is formed by sputter deposition, the second layer is formed by dipping, and the resultant is dried at 100 to 150° C. After a conductive adhesive material described later is applied to the resultant, baking is performed thereon at 950 to 1050° C., thereby producing a fuel cell stack described later.

In addition, in a case where the first and second layers are provided by dipping, after the first layer is subjected to dipping, baking is performed thereon at 950 to 1050° C., and after the second layer is formed by dipping the second layer, baking is performed thereon at the same temperature. Thereafter, a conductive adhesive material is applied thereto, and baking is performed at the same temperature, thereby manufacturing a fuel cell stack described later.

In addition, it is preferable that the thickness of the second layer 203 falls within a range of 5 to 50 μm, and particularly, it is more preferable that the thickness thereof falls within a range of 10 to 30 μm. As the thickness is equal to or greater than 5 μm, diffusion of Cr can be suppressed, and during the formation of the second layer 203, generation of voids due to infusion of air or the like can be suppressed. In addition, as the thickness is equal to or smaller than 50 μm, generation of internal stress due to a difference in the coefficient of thermal expansion with respect to the current collecting base material 201 can be suppressed.

Here, by laminating the first layer 202 which is the layer of the Zn-containing oxide and the second layer 203 that does not contain ZnO but contains the (La, Sr)$MnO_3$-based perovskite oxide in that order on the surface of the Cr-containing alloy (the current collecting base material 201), diffusion of Cr can be suppressed, though exact reasons are not known. Accordingly, generation of a coating of chromium oxide on the surface of the current collecting member 20 is suppressed, so that an increase in electrical contact resistance can be suppressed, and a reduction in the amount of Cr contained in the current collecting base material 201 can be suppressed, thereby suppressing degradation of the heat resistance of the current collecting member 20. In addition, the second layer 203 may also be made only of LSM. Accordingly, diffusion of Cr can be further suppressed.

In the case where the current collecting member 20 made of the alloy member for the fuel cell is used as the current collecting member 20, it is preferable that the Cr-diffusion suppression layer 204 made by laminating the second layer 203 on the first layer 202 is provided on the entire surface of the current collecting base material 201. In addition, the surface of the current collecting base material 201 indicates a surface exposed to the air. This also applies to the surface of the Cr-containing alloy.

Figure 2:
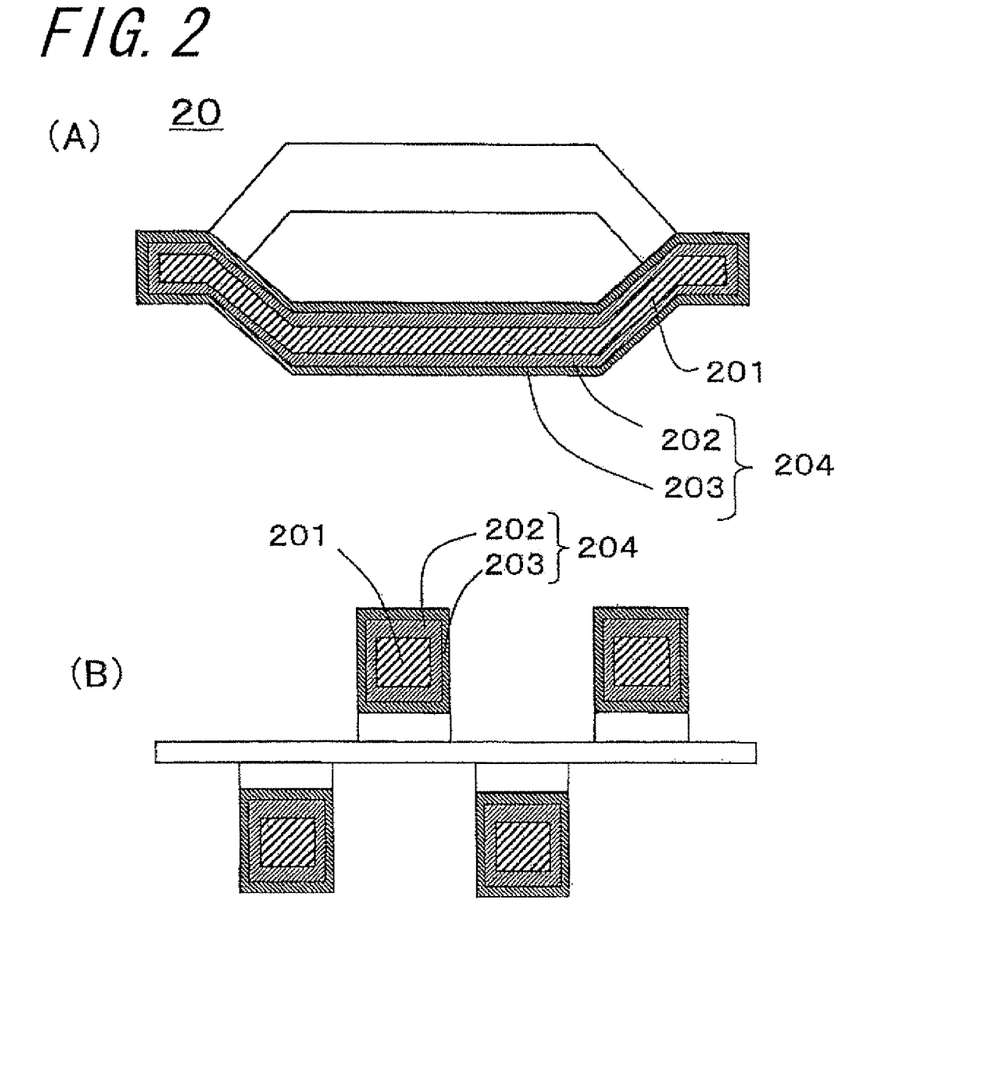
FIG. 2(A) is an enlarged cross-sectional view taken along the line A-A of the current collecting member shown in FIG. 1.
FIG. 2(B) is an enlarged cross-sectional view extracting and showing a part of the cross-section taken along the line B-B of the current collecting member shown in FIG. 1.

Here, the current collecting member 20 is not limited to the shape as shown in FIGS. 1 and 2. As another example, for example, as well as a cylindrical shape and a mesh shape, the current collecting member 20 may be formed by processing a plate-like member into a comb shape and alternately bending adjacent teeth to the opposite sides.

Figure 3:
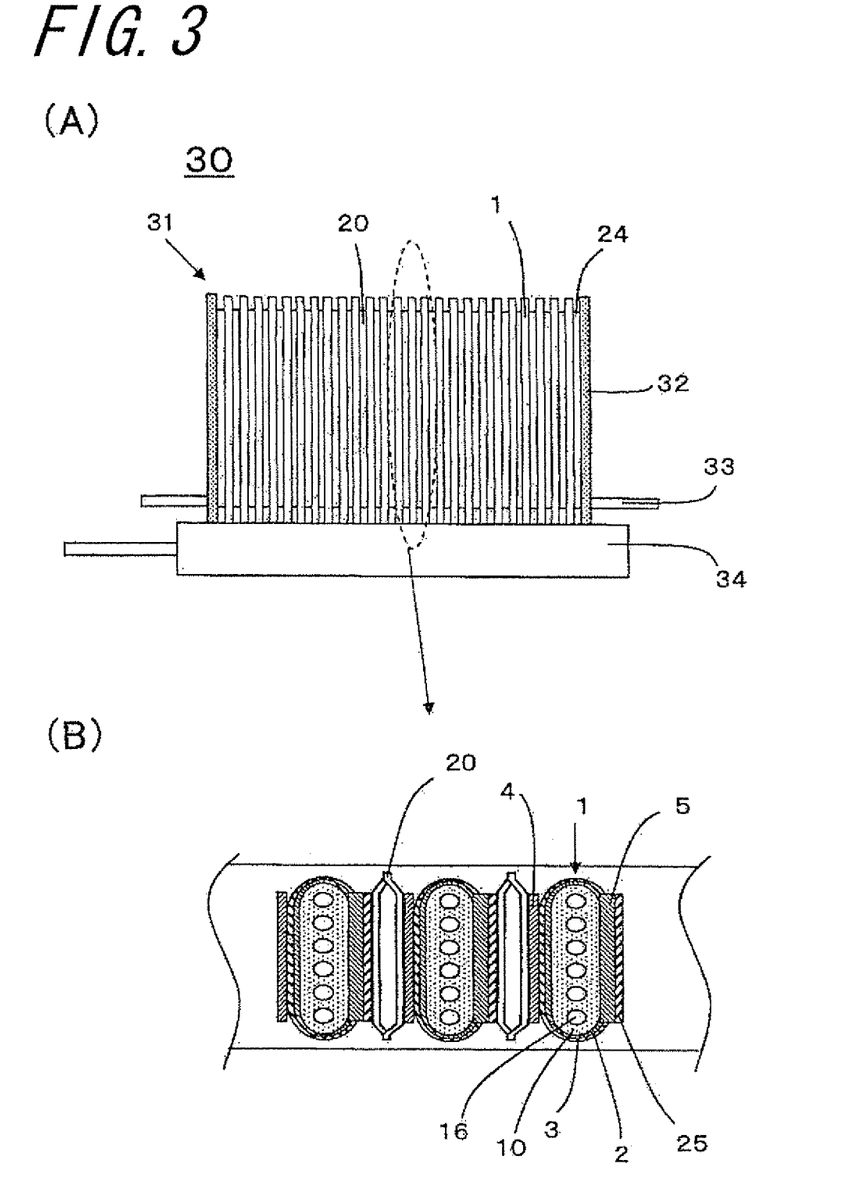
FIG. 3 shows an example of the fuel cell stack device of the invention.
Figure 4:
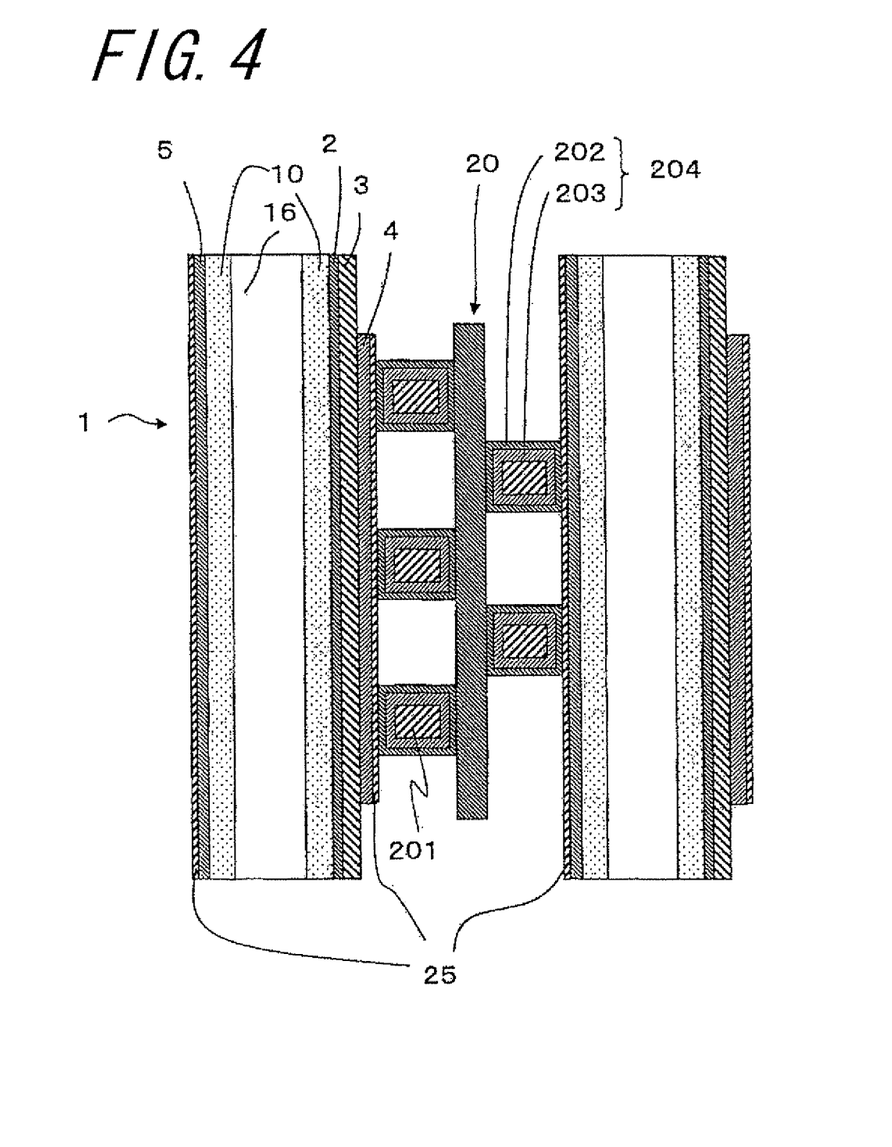
FIG. 4 is a longitudinal cross-sectional view extracting and showing a part of the fuel cell stack device according to the invention.

FIG. 3 shows an example of the fuel cell stack device according to the invention, FIG. 3(A) is a side view schematically showing the fuel cell stack device, and FIG. 3(B) is an enlarged plan view of a part of the section surrounded by the dotted frame of the fuel cell stack device. In addition, in FIG. 3(B), in order to clarify a section corresponding to the section surrounded by the dotted frame shown in FIG. 3(A), the section is indicated by the arrow. In addition, FIG. 4 is a longitudinal cross-sectional view extracting and showing a part of the fuel cell stack device shown in FIG. 3.

Here, the fuel cell stack device 30 is formed by: erecting a plurality of fuel cells 1, each of which has a columnar shape (a hollow flat plate shape) made by laminating a fuel-side electrode layer 2 as an inside electrode layer, a solid electrolyte layer 3, and an air-side electrode layer 4 as an outside electrode layer in that order on one flat surface of a column-shaped conductive support member 10 having a pair of parallel flat surfaces (hereinafter, occasionally abbreviated to the support member 10); electrically connecting the adjacent cells fuel 1 in series via the current collecting member 20 to form a fuel cell stack 31; and fixing a lower end of each fuel cell 1 to a manifold 34 configured to supply a reactant gas (fuel gas) to the fuel cells 1. In addition, the fuel cell stack device 30 includes elastically deformable conductive members 32 of which the lower ends are fixed to the manifold 34 so as to interpose the fuel cell stack 31 with end-side current collecting members 24 from both ends of the fuel cells 1 in the arrangement direction thereof. In addition, in the following description, unless otherwise noted, the inside electrode layer is described as the fuel-side electrode layer 2, and the outside electrode layer is described as the air-side electrode layer 3. In addition, the end-side current collecting member 24 may have the same configuration as that of the current collecting member 20 or may also have a different configuration from that of the current collecting member 20. It is preferable that even in the end-side current collecting member 24, the above-described Cr-diffusion suppression layer 204 is provided.

Moreover, in the conductive member 32 shown in FIG. 3, there is provided a current drawing section 33 configured to draw out current that is generated by power generation of the fuel cell stack 31 (the fuel cells 1) in a shape extending outward along the arrangement direction of the fuel cells 1. Since the conductive member 32 may be made of an alloy containing Cr like the current collecting member 20, it is preferable that the above-mentioned Cr-diffusion suppression layer 204 is also provided in the conductive member 32. Accordingly, diffusion of Cr can be suppressed.

Moreover, an interconnector 5 is provided on the other flat surface of the fuel cell 1, and inside the support member 10, a plurality of gas flow channels 16 configured to cause the reactant gas (the fuel gas) to flow to the fuel cell 1 is provided along the longitudinal direction of the fuel cell 1 to penetrate from the lower end to the upper end of the fuel cell 1.

In addition, by bonding the fuel cell 1 to the current collecting member 20 with a conductive adhesive material 25, contact between the two becomes an ohmic contact, and thus a potential drop is reduced, so that it becomes possible to effectively avoid degradation of current collecting performance.

In addition, the fuel cell 1 may also be configured by causing the support member 10 to serve as the fuel-side electrode layer 2 and sequentially laminating the solid electrolyte layer 3 and the air-side electrode layer 4 on one surface thereof.

Hereinafter, members constituting the fuel cell stack device 30 shown in FIG. 4 will be described.

The fuel-side electrode layer 2 may use a well-known material, and may be formed of porous conductive ceramics, for example, $ZrO_2$ solid solution containing a rare earth element such as Y or Yb (referred to as stabilized zirconia, and including partially-stabilized zirconia), and at least one of Ni and NiO.

The solid electrolyte layer 3 needs to have a function as an electrolyte which serves as a bridge of electrons between the electrodes and have gas blocking properties to suppress (prevent) leakage of the fuel gas and the oxygen-containing gas and is thus formed of $ZrO_2$ solid solution containing 3 to 15 mol % of a rare earth element such as Y or Yb. In addition, the solid electrolyte layer 3 may be formed using other materials as long as they have the above properties.

The air-side electrode layer 4 is not particularly limited as long as its material is generally used, and may be formed of, for example, conductive ceramics formed of an $ABO_3$ type perovskite oxide. Particularly, the air-side electrode layer 4 is formed of an $LaFeO_3$ or $LaMnO_3$-based oxide (for example, $La(Fe, Mn)O_3$ or $(La, Sr)(Co, Fe)O_3$) (conductive ceramics). In addition, the air-side electrode layer 4 needs gas permeability, and it is preferable that its open porosity is equal to or higher than 20%, and particularly, in a range of 30 to 50%.

The interconnector 5 may be formed of conductive ceramics, and since the interconnector 5 comes into contact with the fuel gas (the hydrogen-containing gas) and the oxygen-containing gas (air and the like), a material having reduction resistance and oxidation resistance is needed, so that a lanthanum chromite perovskite oxide ($LaCrO_3$-based oxide) is suitably used. The interconnector 5 has to be dense so as to suppress (prevent) leakage of the fuel gas flowing through the gas flow channel 16 provided in the support member 10 and the oxygen-containing gas flowing outside the fuel cell 1, and therefore it is preferable that the interconnector 5 has a relative density of 93% or higher, and particularly, 95% or higher.

The conductive adhesive material 25 is made of a perovskite oxide containing La, and an $LaFeO_3$ or $LaMnO_3$-based oxide which is the same material as that of the air-side electrode layer 4 or the like is preferable. Particularly, it is preferable that the conductive adhesive material 25 is formed of an oxide such as $La(Fe, Mn)O_3$ or $(La, Sr)(Co, Fe)O_3$ (conductive ceramics). Accordingly, the coefficient of thermal expansion of the conductive adhesive material 25 can be close to that of the air-side electrode layer 4, so that thermal stress is relieved, thereby suppressing separation of the current collecting member 20 and the air-side electrode layer 4 from each other.

For the support member 10, a material that has gas permeability to cause the fuel gas to permeate through the fuel-side electrode layer 2 and furthermore has conductive properties to collect current via the interconnector 5 are required. Therefore, for the support member 10, a material that satisfies such a requirement need to be employed, and for example, conductive ceramics, cermet, or the like may be used.

In addition, in the fuel cell 1 shown in FIG. 3, the column-shaped support member 10 has an elliptical column shape extending elongatedly in the erection direction of the fuel cells 1 and has a hollow flat plate shape comprising the pair of flat surfaces which are parallel to each other and both side surfaces having semicircular shapes. In addition, the lower end of the fuel cell 1 and the lower end of the conductive member 32 are fixed to the manifold 34 by, for example, a bonding material (a glass seal material or the like) having excellent heat resistance, such that the gas flow channels 16 provided in the support member 10 are communicated with a fuel gas chamber (not shown). In addition, in the following description, the fuel cell 1 having the hollow flat plate shape is used for the description.

In addition, when the fuel cell 1 is produced, in a case where the support member 10 is produced by co-firing the fuel-side electrode layer 2 and the solid electrolyte layer 3, it is preferable that the support member 10 is formed of an iron-group metal component such as Ni and a specified rare-earth oxide such as $Y_2O_3$. In addition, it is preferable that the open porosity of the support member 10 is 30% or higher, and particularly, in a range of 35 to 50% to have gas permeability, and that the conductivity thereof is 50 S/cm or higher, preferably, 300 S/cm or higher, and particularly preferably, 440 S/cm or higher.

In this fuel cell 1, a part of the fuel-side electrode layer 2 which faces the air-side electrode layer 4 functions as a fuel-side electrode. That is, the oxygen-containing gas (air and the like) is caused to flow outside the air-side electrode layer 4, and the fuel gas (the hydrogen-containing gas) is caused to flow through the gas flow channel 16 inside the support member 10, and heating is performed to a predetermined operation temperature, such that an electrode reaction as the following formula (1) occurs at the air-side electrode layer 4 and an electrode reaction such as the following formula (2) occurs at the part of the fuel-side electrode layer 2 which serves as the fuel-side electrode, thereby generating power.

Air-side electrode: $\frac{1}{2}O_2 + 2e^- \rightarrow O^{2-}$ (1)

Fuel-side electrode: $O^{2-} + H_2 \rightarrow H_2O + 2e^-$ (2)

In addition, the manifold 34 is made of an alloy containing Cr to be easily processed and to reduce the influence on heat resistance, the fuel cell 1, and the seal material, and comprises the Cr-diffusion suppression layer 204 made by laminating, on the outer surface of the alloy, the first layer 202 which is the Zn-containing oxide and the second layer 203 that does not contain ZnO but contains the (La, Sr)MnO$_3$-based perovskite oxide in that order.

Accordingly, diffusion of Cr can be suppressed. In addition, since the second layer 203 does not contain Zn, generation of cracks in the second layer 203 can be suppressed, thereby providing a manifold 34 with the improved long-term reliability.

Here, the housing that houses the fuel cell stack device 30 therein is in an oxidizing atmosphere as the oxygen-containing gas (air or the like) is supplied. In the oxidizing atmosphere, Cr contained in the alloy is oxidized, and in a case where the fuel cell device is operated at high temperature, there is concern that a coating of chromium oxide may be formed on the outer surface of the manifold 34. Particularly, the outer surface (particularly the upper portion) of the manifold 34 positioned near the fuel cell 1 is exposed to the high-temperature oxidizing atmosphere, so that the coating of chromium oxide is more likely to be formed. When the coating of chromium oxide is formed, there is concern that volatilization of Cr vapor (so-called Cr volatilization) may occur.

Here, when Cr is volatilized in the fuel cell 1, the volatilized Cr reaches the air-side electrode 4 or an interface between the air-side electrode 4 and the solid electrolyte layer 3, resulting in an increase in electric resistance, so that there is concern that the power generation performance of the fuel cell 1 may be deteriorated. In addition, when the coating of chromium oxide is formed on the surface, there is concern that Cr may be discharged outside the fuel cell device described later, which is not preferable in terms of the environment.

Here, since the manifold 34 is formed of the alloy member for the fuel cell comprising the Cr-diffusion suppression layer 204 formed by laminating the first layer 202 and the second layer 203 in that order on the outer surface of the alloy containing Cr, diffusion of Cr can be suppressed, so that formation of the coating of chromium oxide on the outer surface of the manifold 34 can be suppressed. Here, it is preferable that the Cr-diffusion suppression layer 204 is provided on the outer surface of the alloy containing Cr, and particularly, the upper portion thereof, and furthermore, it is more preferable that the Cr-diffusion suppression layer 204 is provided on the entire outer surface of the alloy containing Cr.

In addition, in the above-described example, the fuel gas is caused to flow inside the manifold 34 as the reactant gas and the oxygen-containing gas is caused to flow outside the fuel cell 1. However, the fuel cell 1 may have a configuration in which the air-side electrode layer 4, the solid electrolyte layer 3, and the fuel-side electrode layer 2 are sequentially laminated on the one flat surface of the support member 10, and the oxygen-containing gas is caused to flow inside the manifold 34 and the fuel gas is caused to flow outside the fuel cell 1. In this case, the surface of the manifold 34 exposed to the oxidizing atmosphere is the inner surface of the manifold 34, so that it is preferable that the first layer 202 and the second layer 203 are coated on the inner surface of the manifold 34 in that order.

In addition, the outer surface of the manifold 34 indicates the surface of the manifold 34 facing outside, and the inner surface of the same manifold 34 indicates the surface facing inside.

In addition, the solid oxide fuel cell which is a kind of fuel cell generates power under a high-temperature condition of approximately 600 to 900° C., and therefore the inside of the housing also becomes a very high temperature. Therefore, for example, in a case where a housing body, a reformer housed inside the housing, and the like are produced of alloys containing Cr in consideration of heat resistance, each member may be produced using the alloy member for the fuel cell according to the invention. Accordingly, Cr poisoning of the solid oxide fuel cell can be suppressed. Moreover, in a case where a member that needs conductive properties is formed of the heat-resistant alloy member for the fuel cell according to the invention, a predetermined conductivity can be ensured by increasing the amount of MnCo$_2$O$_4$ contained in the first layer 202.

Here, the case where the inner surface side of the manifold 34 that has the configuration in which the fuel gas is caused to flow through the gas flow channel 16 of the fuel cell 1 is made by coating the surface of the alloy containing Cr with the first layer 202 and the second layer 203 in that order, that is, a case where the inner surface side of the manifold 34 is in a reduction atmosphere will be described. In this case, though exact reasons are not known, it is thought that a metal oxide containing Zn in the first layer 202 is broken down in the reduction atmosphere and thus becomes a metal compound containing Zn. The metal compound containing Zn is moved to the front end of the fuel cell 1 from the inside of the manifold 34 through the gas flow channel 16, and is oxidized by the oxygen-containing gas near the front end of the fuel cell 1. Accordingly, a metal oxide containing Zn precipitates near the outlet of the gas flow channel 16, so that there is concern that the gas flow channel 16 may be clogged near the front end of the fuel cell 1. Therefore, it is preferable that the surface exposed to the reduction atmosphere does not comprise the Cr-diffusion suppression layer 204. In addition, in this case, since Cr is not oxidized in the reduction atmosphere, a coating of chromic oxide is not formed on the surface of the Cr-containing alloy, and therefore there is no concern of volatilization of Cr vapor.

Figure 5:
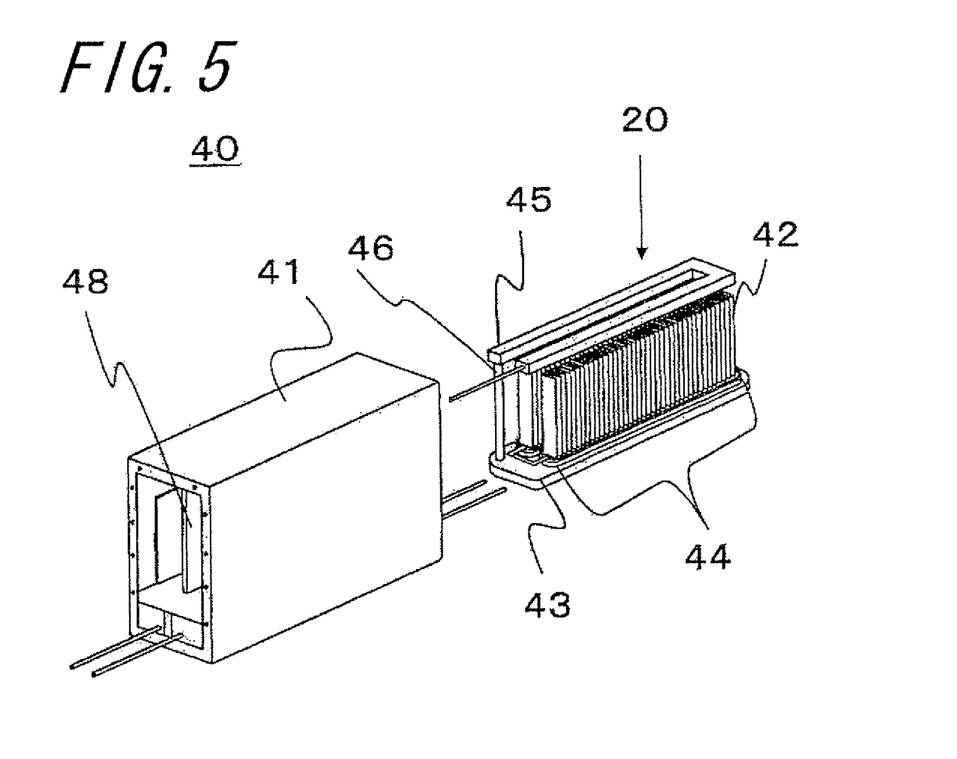
FIG. 5 is an external perspective view showing an example of a fuel cell module according to the invention.

FIG. 5 is an external perspective view showing an example of a fuel cell module 40 according to the invention.

In FIG. 5, the fuel cell module 40 has a configuration in which, in a housing 41 having a rectangular parallelepiped shape, a fuel cell stack 44 is configured by arranging fuel cells 42 having gas flow channels (not shown) through which a fuel gas flows to be erected, and electrically connecting the adjacent fuel cells 42 in series via a current collecting member (not shown), and a fuel cell stack device 47 made by fixing the lower ends of the fuel cells 42 to a manifold 43 by an insulating bonding material (not shown) such as a glass seal material is housed.

In addition, in FIG. 5, in order to obtain the fuel gas used in the fuel cells 42, a reformer 45 configured to generate the fuel gas by reforming a raw fuel such as natural gas or kerosene is disposed above the fuel cell stack 44. In addition, the fuel gas generated by the reformer 45 is supplied to the manifold 43 via a gas communication tube 46, and is supplied to the gas flow channel 16 provided in the fuel cell 42 via the manifold 43.

In addition, in FIG. 5, a state in which parts (front and rear faces) of the housing 41 are removed and the fuel cell stack device 47 and the reformer 45 housed therein are taken out rearward is shown. Here, in the fuel cell module 40 shown in FIG. 5, it is possible to house the fuel cell stack device 47 in the housing 41 by sliding movement. In addition, the fuel cell stack device 47 may include the reformer 45.

In addition, an oxygen-containing gas introduction member 48 provided in the housing 41 is disposed between the fuel cell stacks 44 disposed in parallel on the manifold 43 in FIG. 5, and supplies an oxygen-containing gas to the lower ends of the fuel cells 42 so as to cause the oxygen-containing gas (air) to flow from the lower end to the upper end of a side of the fuel cell 42 in accordance with the flow of the fuel gas. In addition, as the fuel gas discharged from the gas flow channel 16 of the fuel cell 42 and the oxygen-containing gas are burned at the upper end side of the fuel cell 42, the temperature of the fuel cell 42 can be increased, thereby advancing starting of the fuel cell stack device 47. In addition, as the fuel gas discharged from the gas flow channel 16 of the fuel cell 42 is burned at the upper end side of the fuel cell 42 in the longitudinal direction, the reformer 45 disposed above the fuel cells 42 (the fuel cell stack 44) can be warmed up. Accordingly, the reformer 45 can effectively perform a reforming reaction.

Figure 6:
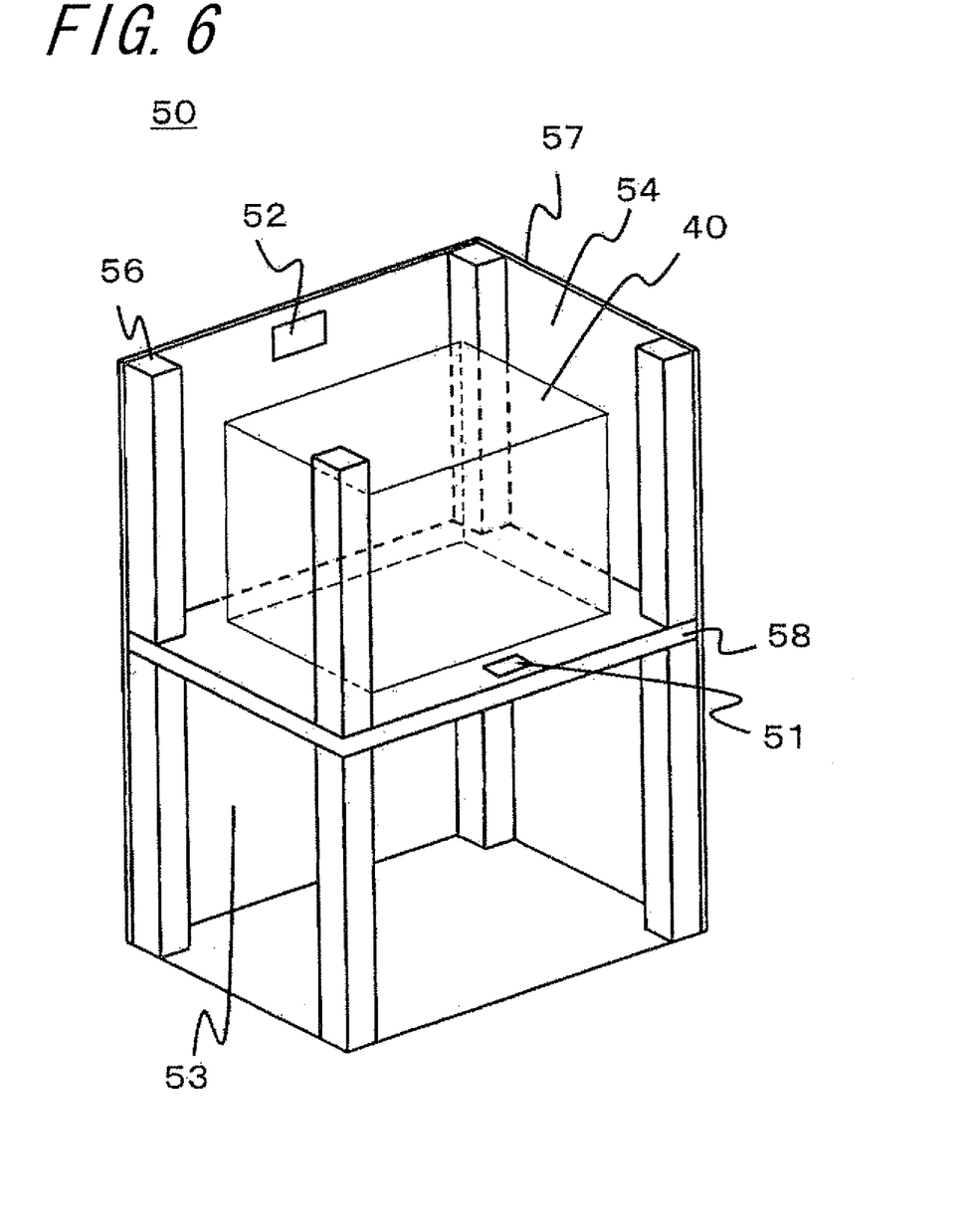
FIG. 6 is an exploded perspective showing an example of a fuel cell device according to the invention.

FIG. 6 is an exploded perspective showing an example of a fuel cell device 50 according to the invention. In addition, some components are omitted in FIG. 6.

The fuel cell device 50 shown in FIG. 6 includes an exterior case composed of a support column 56 and a covering plate 57, the external case being partitioned into upper and lower sides by a partition plate 58, the upper side being set as a module housing chamber 54 that houses the above-described fuel cell module 40, and the lower side being set as an auxiliary device housing chamber 53 that houses auxiliary devices configured to operate the fuel cell module 40. In addition, the auxiliary devices housed inside the auxiliary device housing chamber 53 are omitted.

In addition, the partition plate 58 comprises an air communication port 51 through which air of the auxiliary device housing chamber 53 flows to the module housing chamber 54, and a part of the exterior plate 57 constituting the module housing chamber 54 comprises an exhaust port 52 through which air in the module housing chamber 54 is exhausted.

In this fuel cell device 50, as described above, the fuel cell module 40 that can enhance long-term reliability is configured to be housed in the module housing chamber 54, so that a fuel cell device with excellent long-term reliability can be provided.

While the invention has been described in detail, the invention is not limited to the above-described embodiments, and various modifications and improvements can be made without departing from the spirit and scope of the invention.

For example, the heat-resistant alloy according to the invention is not limited to the solid oxide fuel cell, and may be used for members such as the housing used under a high-temperature condition. For example, as another fuel cell, a molten carbonate fuel cell that generates power at 600 to 700° C. can be effectively applied.

EXAMPLES

The following experiments were performed for the purpose of examining the effects on the conductivity of the heat-resistant alloy and diffusion of Cr.

First, the first layer was produced using each sample shown in Table 1 as follows.

The first layer was produced by mixing ZnO powder, $Mn_2O_3$ powder, and $Co_3O_4$ powder appropriately so that ZnO, $ZnMn_2O_4$, and $MnCo_2O_4$ which were contained in the first layer had amounts shown in Table 1. In order to produce Sample Nos. 2 to 4, 15, and 16 containing ZnO in the first layers, amounts of ZnO powder, $Mn_2O_3$ powder, and $Co_3O_4$ powder were appropriately mixed.

In addition, in a case where Sample Nos. 6 to 9 were produced, ZnO powder, $Mn_2O_3$ powder, and $Co_3O_4$ powder were appropriately mixed so that $ZnMn_2O_4$ and $MnCo_2O_4$ had amounts shown in Table 1. For example, in a case where the first layer of the Sample No. 6 containing 5% of $MnCo_2O_4$ in terms of mol % was produced, a dipping solution for the first layer was prepared by mixing powder in which ZnO powder, $Mn_2O_3$ powder, and $Co_3O_4$ powder were mixed at a ratio of 33 mass %, 63 mass %, and 4 mass %, respectively, in terms of mass ratio, an aqueous binder, and ion-exchange water as a diluent.

In addition, in a case where Sample Nos. 10 to 14, 17, 18, 20, and 21 were produced, respective dipping solutions for the first layer were prepared by blending powder in which $ZnMn_2O_4$ powder and $MnCo_2O_4$ powder were mixed so that $ZnMn_2O_4$ and $MnCo_2O_4$ had amounts shown in Table 1, an aqueous binder, and ion-exchange water as a diluent.

In addition, in a case where Sample Nos. 1, 5, and 19 were produced, respective dipping solutions for the first layer were prepared by blending ZnO powder, $ZnMn_2O_4$ powder, $MnCo_2O_4$ powder, an aqueous binder, and ion-exchange water as a diluent.

In addition, ZnO powder, $Mn_2O_3$ powder, $Co_3O_4$ powder, $ZnMn_2O_4$ powder, and $MnCo_2O_4$ powder having an average particle size of 0.6 μm were used for the first layer.

Next, the second layer was produced of each sample shown in Table 1 as follows.

The second layer was produced by mixing LSCF powder, LSM powder, ZnO powder, and $Mn_2O_3$ powder appropriately so that LSCF, LSM, and ZnO which were contained in the second layer had amounts shown in Table 1. For example, in a case where the second layer of Sample No. 13 containing 3 mass % of LSM in terms of mol % was produced, a dipping solution for the second layer for Sample No. 13 was prepared by blending 1 mass % of $Mn_2O_3$ powder with respect to LSCF in terms of mass %, an acrylic binder, and toluene as a diluent.

In addition, Sample Nos. 9 to 12 and 14 were produced by mixing LSCF powder with LSM powder so that the amount of LSM had the amount shown in Table 1. For example, a dipping solution for the second layer for Sample No. 9 was prepared by mixing powder in which LSCF powder and $La_{0.8}Sr_{0.2}MnO_3$(LSM) powder were mixed to each occupy 50 mass %, an acrylic binder, and toluene as a diluent.

Similarly, for Sample No. 20 which is a comparative example, a dipping solution for the second layer was prepared by mixing LSCF powder, an acrylic binder, and toluene as a diluent. In addition, a dipping solution for the second layer for Sample No. 21 which is a comparative example was prepared by mixing powder in which LSCF powder, and LSM powder, and ZnO powder were mixed to respectively have 40 mass %, 50 mass %, and 10 mass % in terms of mass ratio, an acrylic binder, and toluene as a diluent.

In a case where Sample Nos. 1 to 8 and 15 to 19 were produced, dipping solutions for the second layer were prepared by mixing LSM powder, an aqueous binder, and ion-exchange water as a diluent.

In addition, ZnO powder, $Mn_2O_3$ powder, LSM powder, and LSCF powder having an average particle size of 0.6 μm were used for the second layer.

Thereafter, an alloy formed of an Fe—Cr heat-resistant alloy plate (containing 75 mass % of Fe, and the balance composed of Cr, Mn, and Ni) having a thickness of 0.4 mm, a vertical size of 20 mm, and a horizontal size of 20 mm was dipped into the dipping solution for the first layer for each sample to be applied onto the entire surface of the alloy. Thereafter, the resultant was dried for 1 hour at 130° C., was subjected to a debindering process for 2 hours at 500° C., and was baked in a furnace for 2 hours at 950 to 1050° C.

Thereafter, the resultant was in the dipping solution for the second layer for each sample, and was baked at the same temperature to provide the second layer on the surface of the first layer.

In addition, into a slurry that could be obtained by adding LSCF powder having an average particle size of 0.5 μm, an acrylic binder, and a glycolic solvent, the alloy provided with the second layer was dipped, a conductive adhesive material (LSCF layer) having a thickness of 15 μm was provided on the surface of the second layer, and the resultant was backed at the same temperature, thereby producing test pieces.

In addition, the conductivities of the test pieces were measured by a four-terminal method at temperature of 550 to 900° C. in the air.

After each test piece generated power for 100 hours, the cross-section of the conductive adhesive material was checked by EPMA (wavelength-dispersive X-ray micro analyzer). EPMA analysis was performed using JXA-8100 made by JEOL Ltd., and measurement conditions included a pressurized voltage of 15 kV, a probe current of $2.0 \times 10^{-7}$ A, and an analysis area of 50 μm×50 μm. In addition, dispersive crystal was LiF. The content of Cr was measured at a point from an interface between the second layer and the conductive adhesive material on the conductive adhesive material side by 10 μm, and the result is shown in Table 1.

In addition, since the conductive adhesive material (LSCF layer) easily reacts with Cr and generates a reaction product, in a case where Cr is diffused to the conductive adhesive material, the reaction product of Cr is formed by the conductive adhesive material. Therefore, in the cross-section of the conductive adhesive material, diffusion of Cr can be confirmed by the amount of Cr (mass %).

TABLE 1

| Sample No. | First layer | | | Second layer | | | Conductivity (S/cm) | Amount of Cr in Conductive adhesive material (mass %) |
| --- | --- | --- | --- | --- | --- | --- | --- | --- |
| | ZnO (mol %) | $ZnMn_2O_4$ (mol %) | $MnCo_2O_4$ (mol %) | LSCF (mass %) | LSM (mass %) | ZnO (mass %) | | |
| 1 | 100 | — | — | — | 100 | — | 0.07 | 0 |
| 2 | 50 | 50 | — | — | 100 | — | 0.10 | 0 |
| 3 | 75 | — | 25 | — | 100 | — | 1.74 | 0 |
| 4 | 25 | 50 | 25 | — | 100 | — | 2.14 | 0 |
| 5 | — | 100 | — | — | 100 | — | 0.10 | 0 |
| 6 | — | 95 | 5 | — | 100 | — | 0.72 | 0 |
| 7 | — | 85 | 15 | — | 100 | — | 1.64 | 0 |
| 8 | — | 75 | 25 | — | 100 | — | 2.01 | 1 |
| 9 | — | 75 | 25 | 50 | 50 | — | 3.49 | 3 |
| 10 | — | 75 | 25 | 70 | 30 | — | 3.78 | 3 |
| 11 | — | 75 | 25 | 90 | 10 | — | 4.23 | 4 |
| 12 | — | 75 | 25 | 95 | 5 | — | 4.89 | 5 |
| 13 | — | 75 | 25 | 97 | 3 | — | 5.02 | 8 |
| 14 | — | 70 | 30 | 99 | 1 | — | 5.86 | 10 |
| 15 | 10 | 75 | 15 | — | 100 | — | 1.32 | 4 |
| 16 | 15 | 75 | 10 | — | 100 | — | 1.05 | 6 |
| 17 | — | 50 | 50 | — | 100 | — | 4.21 | 4 |
| 18 | — | 30 | 70 | — | 100 | — | 5.56 | 5 |
| 19 | — | — | 100 | — | 100 | — | 10.30 | 7 |
| *20 | — | 75 | 25 | 100 | — | — | 5.57 | 27 |
| *21 | — | 75 | 25 | 40 | 50 | 10 | 0.02 | 29 |

Asterisk (*) represents out of the range of the invention

As the result of Table 1, in Sample Nos. 1 to 19 that did not contain ZnO in the second layers but contained LSM, 10 mass % or less of Cr was diffused in the conductive adhesive material, whereas in Sample No. 20 of which the second layer was formed only of LSCF, 27 mass % of Cr was diffused. In addition, in Sample No. 21 of which the second layer contained ZnO, 29 mass % of Cr was diffused.

In addition, in Sample No. 21, cracks were generated on the surface of the test piece, and in order to observe the cracks, the Cr-diffusion suppression layer was cut to show the cross-section of each layer thereof, and the cross-sections were observed by a scanning electron microscope (SEM). AS a result, small cracks were generated in the second layer.

In addition, Sample Nos. 3, 4, and 6 to 19 in which the first layers contained $MnCo_2O_4$ and the second layers did not contain ZnO but contained LSM exhibited high conductivities while suppressing diffusion of Cr. Particularly, Sample No. 3, 4, 8 to 14, and 17 to 19 in which the first layers contained 25 mol % or higher of $MnCo_2O_4$ exhibited high conductivities of 1.74 S/cm or higher.

Figure 7:
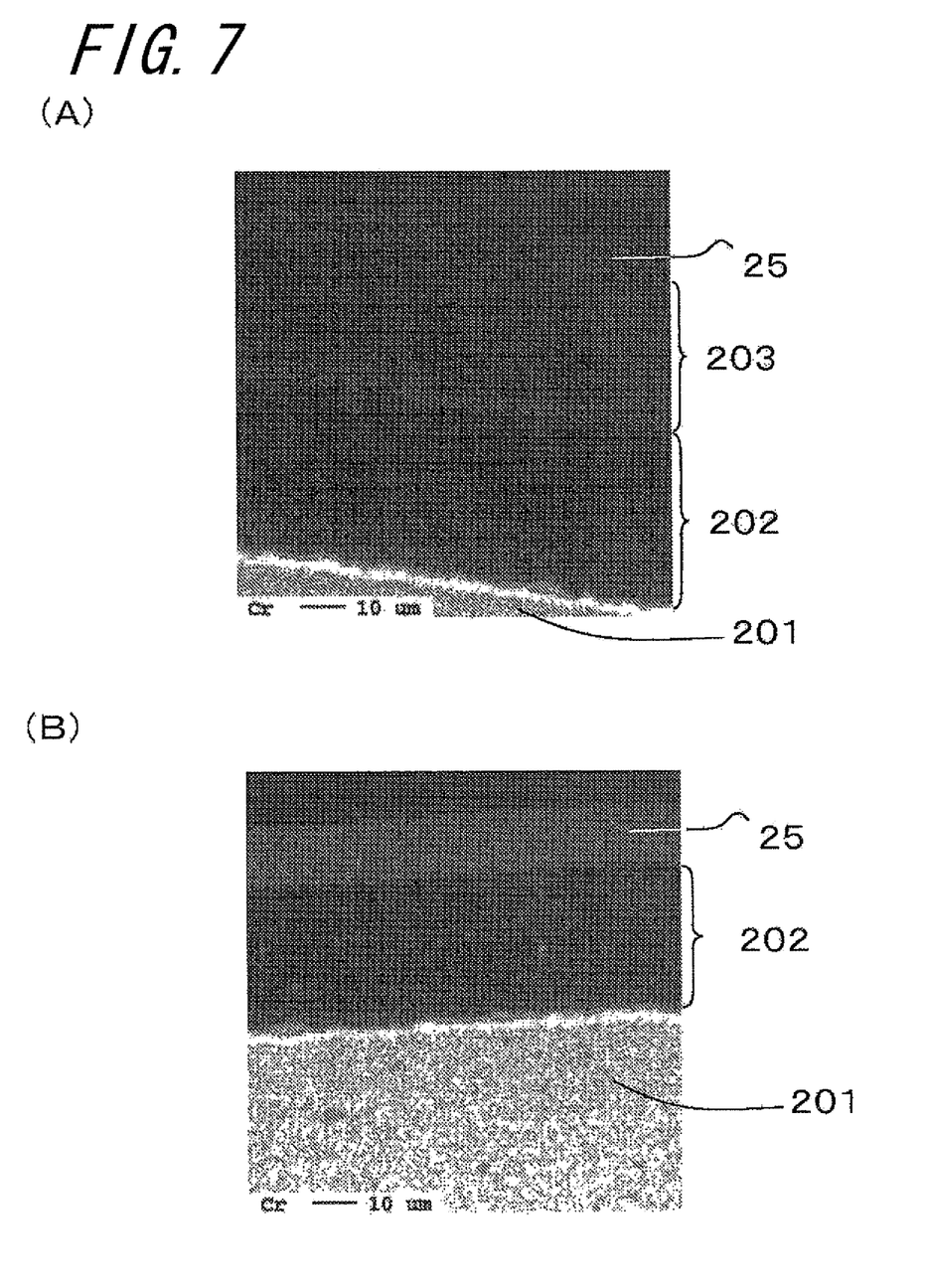
FIG. 7(A) is an EPMA photograph of a current collecting member comprising a Cr-diffusion suppression layer made by laminating a first layer that contains a Zn-containing oxide and a second layer that does not contain ZnO but contains an (La, Sr)MnO$_3$-based perovskite oxide in that order on the surface of a Cr-containing alloy and comprising a conductive adhesive material on the surface of the second layer.
FIG. 7(B) is an EPMA photograph of a current collecting member made by laminating a first layer that contains a Zn-containing oxide and a second layer that does not contain ZnO but contains an (La, Sr) (Co, Fe)$O_3$-based perovskite oxide in that order and providing a conductive adhesive material on the surface thereof.

In addition, FIG. 7 shows observation results of the cross-sections of the test pieces of Sample Nos. 1 and 20 by EPMA. In addition, in FIG. 7, FIG. 7(A) is an EPMA photograph of the cross-section of the test piece of Sample No. 20, and FIG. 7(B) is an EPMA photograph of the cross-section of the test piece of Sample No. 1. From the photographs, it can be seen that the heat-resistant alloy (the alloy member for the fuel cell) according to the invention in which the first layer contains the Zn-containing oxide and the second layer does not contain ZnO but contains the (La, Sr)MnO$_3$-based perovskite oxide effectively suppresses diffusion of Cr contained in the alloy.

REFERENCE SIGNS LIST 1, 42: Fuel cell
20: Current collecting member
201: Current collecting base material
202: First layer
203: Second layer
204: Cr-diffusion suppression layer
205: Close-contact layer
30: Fuel cell stack device
31, 44: Fuel cell stack
34, 43: Manifold
40: Fuel cell module
50: Fuel cell device

The invention claimed is:

1. A current collecting member configured to electrically connect a plurality of fuel cells to one another, formed of an alloy member for a fuel cell formed of a heat-resistant alloy, the heat-resistant alloy comprising:
   a Cr-containing alloy; and
   a Cr-diffusion suppression layer located on at least a part of a surface of the Cr-containing alloy, the Cr-diffusion suppression layer being composed of
      a first layer that is disposed directly on the Cr-containing alloy and contains a Zn-containing oxide, and
      a second layer that is disposed directly on the first layer and does not contain ZnO but contains an (La, Sr)MnO$_3$-based perovskite oxide and an (La, Sr)(Co, Fe)O$_3$-based perovskite oxide, the second layer containing at least 1 mass % of the (La, Sr)MnO$_3$-based perovskite oxide.

2. The current collecting member according to claim 1, wherein the first layer contains ZnMn$_2$O$_4$ and MnCo$_2$O$_4$.

3. The current collecting member according to claim 1, wherein the second layer contains at least 5 mass % of the (La, Sr)MnO$_3$-based perovskite oxide.

4. The current collecting member according to claim 2, wherein the first layer contains 70 mol % to 95 mol % of ZnMn$_2$O$_4$.

* * * * *